United States Patent
Mathew et al.

(10) Patent No.: US 11,575,642 B2
(45) Date of Patent: Feb. 7, 2023

(54) MULTI-PATH TRAFFIC SELECTION FOR PORTS IN OVERLAY NETWORKS

(71) Applicant: VMware, Inc., Palo Alto, CA (US)

(72) Inventors: Subin Cyriac Mathew, San Jose, CA (US); Chidambareswaran Raman, Campbell, CA (US)

(73) Assignee: VMware, Inc., Palo Alto, CA (US)

( * ) Notice: Subject to any disclaimer, the term of this patent is extended or adjusted under 35 U.S.C. 154(b) by 220 days.

(21) Appl. No.: 17/068,670

(22) Filed: Oct. 12, 2020

(65) Prior Publication Data
US 2022/0116353 A1 Apr. 14, 2022

(51) Int. Cl.
*H04L 61/2592* (2022.01)
*H04L 45/64* (2022.01)
(Continued)

(52) U.S. Cl.
CPC .......... *H04L 61/2592* (2013.01); *H04L 45/64* (2013.01); *H04L 45/72* (2013.01); *H04L 49/70* (2013.01); *H04L 61/2517* (2013.01); *H04L 69/166* (2013.01); *H04L 12/4633* (2013.01); *H04L 45/24* (2013.01); *H04L 69/325* (2013.01); *H04L 69/326* (2013.01); *H04L 2212/00* (2013.01)

(58) Field of Classification Search
CPC ..... H04L 61/2592; H04L 45/64; H04L 45/72; H04L 49/70; H04L 61/2517; H04L 69/166; H04L 12/4633; H04L 45/24; H04L 69/325; H04L 69/326; H04L 2212/00; H04L 63/00; H04L 65/60
See application file for complete search history.

(56) References Cited

U.S. PATENT DOCUMENTS

2013/0242997 A1* 9/2013 Bansod .................. H04L 45/745
370/392
2017/0126565 A1* 5/2017 Wang .................... H04L 12/465
(Continued)

OTHER PUBLICATIONS

Mahalingam, et al., "Virtual eXtensible Local Area Network (VXLAN): A Framework for Overlaying Virtualized Layer 2 Networks over Layer 3 Networks"; https://tools.ietf.org/html/rfc7348; Aug. 2014 (22 pages).
(Continued)

*Primary Examiner* — Ian N Moore
*Assistant Examiner* — Latresa A Mccallum

(57) ABSTRACT

In some embodiments, a method receives a packet for a flow from a first application in a first workload to a second application in a second workload. The packet includes an inner header that includes layer 4 information for the first application. The method determines if a setting indicates an outer source port in an outer header should be generated using layer 4 information from the inner header. The setting is based on an analysis of packet types in the flow to determine if fragmented packets are sent. When the setting indicates the outer source port in the outer header should be generated using layer 4 information from the inner header, the method generates the outer source port using the layer 4 information for the first application from the inner header. The packet is encapsulated using the outer header, wherein the outer header includes the outer source port.

21 Claims, 11 Drawing Sheets

(51) Int. Cl.
    *H04L 45/00*    (2022.01)
    *H04L 69/166*    (2022.01)
    *H04L 61/2517*    (2022.01)
    *H04L 49/00*    (2022.01)
    H04L 12/46    (2006.01)
    H04L 69/326    (2022.01)
    H04L 69/325    (2022.01)
    H04L 45/24    (2022.01)

(56) References Cited

U.S. PATENT DOCUMENTS

| | | | | |
|---|---|---|---|---|
| 2017/0295100 | A1* | 10/2017 | Hi | H04L 45/125 |
| 2018/0006930 | A1* | 1/2018 | Du | H04L 67/56 |
| 2020/0267113 | A1* | 8/2020 | Wang | H04L 61/2521 |

OTHER PUBLICATIONS

SolarFlare, "Reordering between fragmented and non-fragmented UDP Packets", https://support.solarflare.com/index.php/component/cognidox/?file=SF-119017-KI-1_Reordering_between_fragmented_and_non-fragmented_UDP_packets.htm&catid=0&view=embed&id=3013; Jul. 9, 2020 (1 page).
Related U.S. Appl. No. 16/925,238, filed Jul. 9, 2020 (unpublished), 40 pages.

* cited by examiner

Outer IPv4 Header
600-1

| Version | IHL | Type of Service | Total length | |
|---------|-----|-----------------|--------------|--|
| Identification | | | Flags | Fragment offset |
| Time to Live | | Protocol | Header checksum | |
| Outer Source IPv4 Address  612-1 | | | | |
| Outer Destination IPv4 Address  614-1 | | | | |

Outer UDP Header
602-1

| 616-1   Source Port = 50000 | 618-1 Destination port = 6081 |
|-----------------------------|-------------------------------|
| UDP length | UDP checksum |

Inner IPv4 Header
604-1

| Version | IHL | Type of Service | Total length | |
|---------|-----|-----------------|--------------|--|
| Identification | | | Flags | Fragment offset |
| Time to Live | | Protocol = 17 UDP | Header checksum | |
| Inner Source IPv4 Address  620-1 | | | | |
| Inner Destination IPv4 Address  622-1 | | | | |

Inner UDP Header
606-1

| 624-1   Source Port = 10000 | 626-1 Destination port = 20000 |
|-----------------------------|--------------------------------|
| UDP length | UDP checksum |

FIG. 6

MULTI-PATH TRAFFIC SELECTION FOR PORTS IN OVERLAY NETWORKS

BACKGROUND

Virtual networks may use an underlying physical network as a packet forwarding back plane. For example, a first workload running in a first host may send a packet to a second workload running in a second host. The packet may include an inner source IP address for the first workload and an inner destination IP address for the second workload. The first host may encapsulate the packet with an outer header that includes an outer source IP address associated with a source hypervisor in the first host and an outer destination IP address associated with a destination hypervisor in the second host. Typically, the source IP address and the destination IP address are associated with virtual tunnel endpoints (VTEPs), which may be a hypervisor-based logical functionality that may perform the encapsulation. The first host then sends the encapsulated packet to the underlay physical network, which delivers the packet to the destination hypervisor in the second host based on the outer source IP address. The destination hypervisor removes the outer header, and a local virtual switch instance delivers the packet to the second workload using an inner destination IP address.

Different processes, such as load balancing processes, typically use information in the outer header to differentiate flows to perform services, such as load balancing, equal cost multi-path routing (ECMP), and other services. In some embodiments, the processes use a 5-tuple of <inner source IP address, inner destination IP address, IP next protocol, inner source port, destination source port>. When using encapsulation, multiple flows that are encapsulated by the two VTEP endpoints include the same outer source IP address and outer destination IP address when the flows originate and end at the same workloads. The destination port in the outer header may be a well-known port that is used by tunneling technologies, such as "4789" for Virtual eXtensible Local Area Network (VXLAN) or "6081" for Generic Network Virtualization Encapsulation (Geneve). Accordingly, the source port in the outer header may be used to introduce differences in the packets being sent in two flows. For some layer 4 protocols, when inner packets are fragmented, the first inner packet of the resulting fragmented packets include layer 4 information, but the rest of the fragmented packets include only layer 3 information. When a protocol of this type is encountered, hosts typically only use layer 3 information from the inner packet to determine an outer source port header. User datagram protocol (UDP) is an example of a protocol that includes only layer 3 information in fragmented packets after the first fragmented packet. When a first flow is between a first application in the first host and another application in the second host and a second flow is between a second application in the first host and another application in the second host, the inner IP address of the packets of the two flows are the same (e.g., the first workload's IP address and the second workload's IP address are the same for both flows). When the first host uses only layer 3 information of the source IP address and the destination IP address of the inner header to generate the source port for the outer header, this results in the two flows having the same outer source port. That is, the IP address of the source workload and the destination workload are the same for both flows even though different applications are associated with the flows. Accordingly, the services may consider the packets for the flows the same because the outer headers are the same for both flows. As such, the services may apply the same treatment for the flows, such as assigning the flows to the same physical servers, queues, computer processors, etc.

BRIEF DESCRIPTION OF THE DRAWINGS

With respect to the discussion to follow and in particular to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 6 depicts an example of outer headers and inner headers for a flow #1 between application #1 and application #3 according to some embodiments.

DETAILED DESCRIPTION

Figure 1:
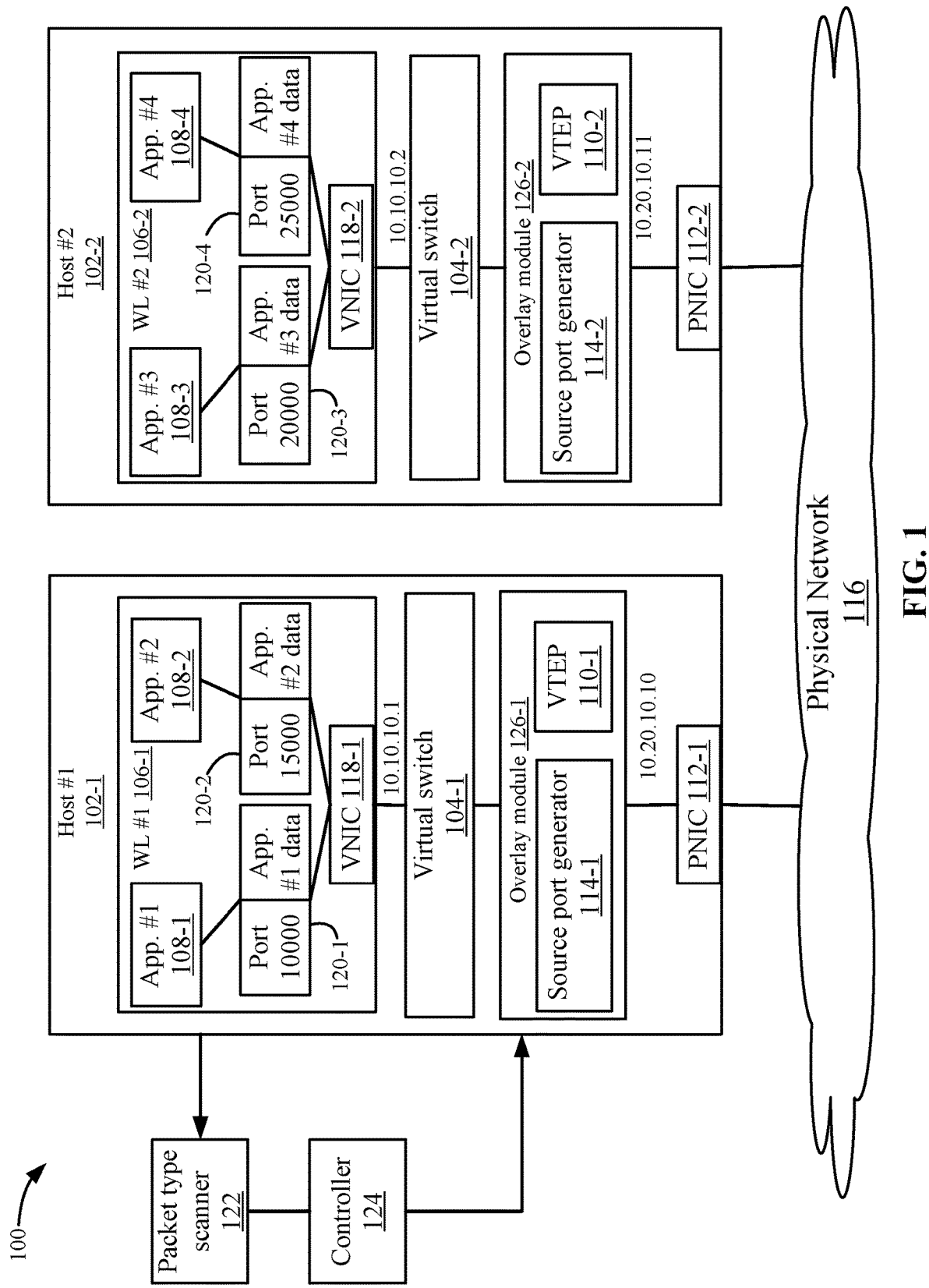
FIG. 1 depicts a simplified system for sending packets using source port generation according to some embodiments.

In the following description, for purposes of explanation, numerous examples and specific details are set forth to provide a thorough understanding of embodiments of the present disclosure. Some embodiments as expressed in the claims may include some or all of the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should be construed as inclusive of the well understood mechanism.

When processing packets for multiple flows between workloads, a hypervisor, such as using a virtual tunnel endpoint (VTEP), may encapsulate the packet with an outer header that includes outer source information and outer destination information. As discussed in the Background, if the host uses only network layer (e.g., layer 3) information from an inner header of the packet to generate the outer source port for the outer header, the source port for the outer header may be the same for two flows. To inject some differences in the source port generation, a source host may use transport layer (e.g., layer 4 information), such as a layer 4 source port and a layer 4 destination port, from the inner header to generate the outer source port in the outer header. In some examples, the source host may generate the outer source port using a tuple of information, which may include the inner source IP address, the inner source port, the inner destination IP address, and the inner destination port (and also the next layer protocol). As discussed above, the flows may include different source applications and/or different destination applications. The different applications from the flows may be associated with different inner source ports and/or different inner destination ports. The source host uses a process, such as a hash of the tuple, to generate different values for outer source ports for the flows. Different values for the outer source port are generated because the inner source port and/or the inner destination port are different for the two flows between different applications. Accordingly, the outer header of packets for the two flows may include different outer source ports, and processes, such as load balancing processes, can differentiate between the packets for the different flows. When applying load balancing to the flows, having a different outer source port allows network traffic for the flows to be distributed more equally across network resources.

Sometimes, a packet sent by a workload may need to be fragmented. For example, a host may fragment a large packet sent by an application if the size of the packet exceeds the maximum transmission unit of the transmit interface. Because the layer 3 packet fragmentation considers the layer 4 header to be "payload," the layer 4 header is only included in the initial packet fragment when a packet is fragmented into a series of fragmented packets. This is true for any layer 4 protocol when packets are fragmented at layer 3. However, Transfer Control Protocol (TCP) includes a built-in "packet segmentation" feature that results in packet segments that should be sized to prevent packet fragmentation. However, some layer 4 protocols, such as user datagram protocol (UDP), may rely on Layer 3 fragmentation to ensure delivery when the maximum transmission unit is smaller than the packet size. Thus, UDP packets may include the layer 4 information in the inner header in the first packet of the fragmented packets, but the rest of the fragmented packets may only include layer 3 information in the inner header. This may result in undesirable packet processing behavior if the host uses layer 4 information to generate the outer source port in the first packet and then uses layer 3 information to generate the outer source port in the other packets because the first packet may have a different outer source port than the other fragmented packets.

For example, the different outer source ports may result in encapsulated packets for the flow being reordered in the packet path to the destination, such as because a load balancer may consider the packets as being from different flows because of the different outer source ports and send them on different paths. To avoid this problem, the host may be set to only use layer 3 source port generation. In this case, all the packets sent between the same workloads do not benefit from any differentiation of flows between different applications by services that are provided, such as load balancing.

For discussion purposes, the term layer 4 source port generation includes using layer 4 information from the inner header to generate the outer source port and layer 3 source port generation includes using layer 3 source port generation. To apply layer 4 source port generation, but also not experience problems of possible reordering of packets that are fragmented, the host may include a scanner that analyzes packet types for workloads. The scanner can analyze whether workloads may send fragmented packets. If that probability is low, then the scanner may apply a setting for a port of an application running in a workload. For example, the scanner sets a property at an overlay module associated with a virtual switch to perform layer 4 source port generation on packets received from the application through the port. Then, flows between different applications can be differentiated by services in a path taken by the packets. Also, since the scanner is used, there is a low probability that the application may send fragmented packets, which may result in reordering when layer 4 source port generation is used on fragmented packets.

System Overview

FIG. 1 depicts a simplified system 100 for sending packets using source port generation according to some embodiments. System 100 includes a first host #1 102-1 and a second host #2 102-2 (collectively hosts 102). Hosts 102 may be networking devices that process and send the packets and include hardware resources including computer processor resources (not shown), memory resources (not shown), and physical network interface cards (PNICs) 112-1 and 112-2. PNICs 112 couple hosts 102-1 and 102-2 to a physical network 116. Although this system is described, any system in which encapsulated packets are sent/received may be used. For example, host 102-1 may be located on-premises in a site and host 102-2 may be located in a public data center, hosts 102 may be located in a single site, etc.

Hosts 102 may run virtualization software (not shown) on which workloads (WLs) 106-1 and 106-2 (collectively workloads 106) run. Any number of workloads may be running on hosts 102, but for illustration purposes, host #1 102-1 is running a workload #1 106-1 and host #2 102-2 is running a workload #2 106-2. Workloads may refer to virtual machines that are running on a respective host, but this is one example of a virtualized computing instance or compute node. Any suitable technology may be used to provide a workload, such as virtual machines, containers, etc. Although a virtualized environment is described, some embodiments may be used in an environment that is not virtualized. Also, the term "workload" may refer to a host that is not virtualized.

Workloads 106 may execute different software applications 108. In some instances, application (APP) 108-1 and/or application 108-2 in workload #1 106-1 may send packets to application 108-3 and/or application 108-4 in workload #2 106-2, and vice versa. For illustrative purposes, application #1 108-1 is communicating with application #3 108-3 and application #2 108-2 is communicating with application #4 108-4. However, it is noted that other configurations may be appreciated, such as application #1 108-1 and application #2 108-2 may both be communicating with a single application in workload #2 106-2, or vice versa.

As mentioned above, host #1 102-1 and host #2 102-2 may use encapsulation to send packets between workload #1 106-1 and workload #2 106-2 via tunnels. A tunnel is a mechanism in which hosts 102 can encapsulate packets with an outer header and send the encapsulated packets via physical network 116, which may be referred to as an underlay. Different tunneling technologies may be used, such as VXLAN and Geneve, but embodiments are not limited to these technologies. Physical network 116 may include physical networking devices, such as routers, which use IP addresses of the outer header to route the packets to the destination in the outer header.

Host #1 102-1 includes a virtual switch 104-1 and host #2 102-2 includes a virtual switch 104-2 that provide connectivity between workloads in hosts 102. Virtual switches 104 may be running within hypervisors or other virtualization software on hosts 102. Virtual switches 104 may be software implemented physical switches that perform functions of physical switches. Virtual switches 104 may be implemented in different configurations, such as a distributed virtual switch that may be a virtual switch that is distributed across multiple hypervisors. In some embodiments, virtual switch 104-1 is associated with an overlay module 126-1 and virtual switch 104-2 is associated with an overlay module 126-2. Overlay modules 126 perform encapsulation of packets and other functions related to sending packets over an overlay tunnel. Overlay module 126-1 includes a VTEP 110-1 and overlay module 126-2 includes a VTEP 110-2. VTEPs 110 may be logical functionality that can perform encapsulation of packets sent by workloads 106. Although VTEPs 110 are shown as running in overlay modules 126, VTEPs 110 may run elsewhere, such as in workloads or other instances running in the hypervisors of each host. Further, any functionality may be used to encapsulate packets in place of VTEPs 110, such as layer 2 concentrators executing in a workload that stretch a layer 2 network across multiple sites may be used to perform encapsulation.

Each VTEP 110 may be associated with an IP address, such as VTEP 110-1 is associated with the IP address of 10.20.10.10 and VTEP 110-2 is associated with the IP address of 10.20.10.11. These IP addresses are recognized by routers in physical network 116 and routers can route the packets using the IP addresses using route tables that list the IP addresses and next hops required to send the packets to the outer destination address. In the process, workload 106-1 may send a packet with the inner source IP address of workload 106-2 and the inner destination address of workload 106-2. The "inner" term is used to differentiate from the IP addresses in the outer header that encapsulates the packet. VTEPs 110 encapsulate the inner packet with an outer header that includes the source IP address of VTEP 110-1 and a destination address of VTEP 110-2. Physical network 116 can then route the encapsulated packets based on the source IP address of VTEP 110-1 and the destination address of the packet to VTEP 110-2. When VTEP 110-2 receives the encapsulated packet, VTEP 110-2 can remove the outer header. Virtual switch 104-2 can then use the destination IP address in the inner header to send the packet to workload #2 106-2.

Applications 108 in workloads 106 may be associated with different ports. Applications 108 may run in guest user space and are associated with application data that identifies the application. A guest kernel space associates a port for an application 108 with respective application data. In some embodiments, the port is a transport layer port that is used at layer 4. For example, at 120-1, application #1 108-1 is connected to a port of "10000" that is associated with application #1 data and at 120-2, application #2 108-2 is connected to a port 15000 that is associated with application #2 data. Similarly, at 120-3, application #3 108-3 is connected to a port 20000 that is associated with application #3 data, and at 120-4, application #4 108-4 is connected to a port 25000 that is associated with application #4 data. The ports on virtual switches 104 provide logical connection points to applications 108. Virtual network interface cards (VNICs) 118-1 and 118-2 that are virtual PNICs presented to respective workloads 106 by the respective hypervisors on hosts 102-1 and 102-2.

Various protocols may be used to send the packets. In some embodiments, UDP is used to send inner packets, which is a connectionless communication model that may not use error checking or error correction. As discussed above, UDP has characteristics where a fragmented packet includes layer 4 information in the first fragmented packet, but not in the subsequent fragmented packets. It will be understood that although UDP is discussed, other protocols that include similar characteristics for including only layer 4 information in one of the fragmented packets may be used.

In some embodiments, overlay module 126-1 includes a source port generator 114-1 that may generate an outer source port value for the outer header when sending packets from workload #1 106-1 to workload #2 106-2. Similarly, overlay module 126-2 includes a source port generator 114-2 that generates outer source port values for packets sent from workload #2 106-2 to workload #1 106-1. As will be described below, source port generators 114 may use layer 4 information from the inner header to generate the outer source port value for packets.

When using a protocol that does not include layer 4 information in some fragmented packets (e.g., other than the first fragmented packet), undesirable packet processing issues may occur when processing the packets in the packet path to the destination. For example, no differentiation between multiple flows may be an issue where applications have latency and jitter constraints that may be exacerbated when there is no load balancing between multiple flows. Also, re-ordering of packets at the destination may occur, which may require the destination to have deep buffers to account for the receipt of non-contiguous packets within a flow. For example, a large UDP packet sent by an application may be fragmented by the guest operating system if the packet exceeds the maximum transmission unit of the workloads IP interface. If source port generator 114 generates the outer source port based on layer 4 information for the first fragment and then uses layer 3 for the subsequent fragmented packets, the encapsulated packets may end up getting re-ordered in the packet path to the destination.

To identify when problems are caused by using layer 4 source port generation, hosts 102-1 and 102-2 send information for packet flows to a packet type scanner 122. Packet type scanner 122 may be located in different areas, such as in a cluster of computing devices that is external from hosts 102, within a workload running on hosts 102, within a workload running on another host, in or with virtual switch 104 on the same host, etc. Packet type scanner 122 may scan the information for packets for flows and analyze the packet types. Packet type scanner 122 may analyze packets that are sent through VNICs 118 of respective hosts 102. As will be discussed in more detail below, packet type scanner 122 may analyze packet types on different levels, such as at the application port level, the virtual switch port level, and the virtual switch level. For example, packet type scanner 122 may determine if applications 108 for workloads 106 are sending fragmented packets and determine whether layer 4 source port generation should be used for respective applications 108 and/or workloads 106. Then, packet type scanner 122 may communicate with a controller 124 to indicate a result of the analysis. Controller 124 may be a management plane computing device that controls a configuration of hosts 102. Although controller 122 is discussed, other devices may be used to configure hosts 102, such as packet type scanner 122, or other management devices.

Controller 124 may include a setting, which may be referred to as a virtual knob, that can be set to allow layer 4 source port generation or not allow layer 4 source port generation. For example, packet scanner 112 may cause controller 124 to set a property for the setting for the virtual knob at the application port level, the virtual switch port level, and/or the virtual switch level. In some examples, controller 124 may set the property at the virtual switch level for all packets sent by virtual switch 104, at the application port level for a port associated with an application 108, or at the virtual switch port level for a port associated with a workload 106 that should use layer 4 source port generation. The decision as to which level to use may be pre-configured or determined dynamically. For example, if multiple workloads are sending fragmented packets, then the setting may be set for layer 3 source port generation at the virtual switch level. If one application is not sending fragmented packets, then the application port is set for layer 4 source port generation. Also, if a workload is not sending fragmented packets, then the virtual switch port coupled to that workload may be set for layer 4 source port generation. Different rules may be configured to determine which entities are assigned layer 4 source port generation based on the analysis. The property for the setting may be turned on and off. For example, the setting may be turned on to use layer 4 source port generation when it is determined an application 108 may not send fragmented packets and may be turned off such that layer 3 source port generation is used when it is determined an application 108 may send fragmented packets. Controller 124 may use other settings also, such as a first value to indicate layer 4 source port generation should be performed and a second value to indicate layer 3 source port generation should be performed.

Packet Scanning

Figure 2:
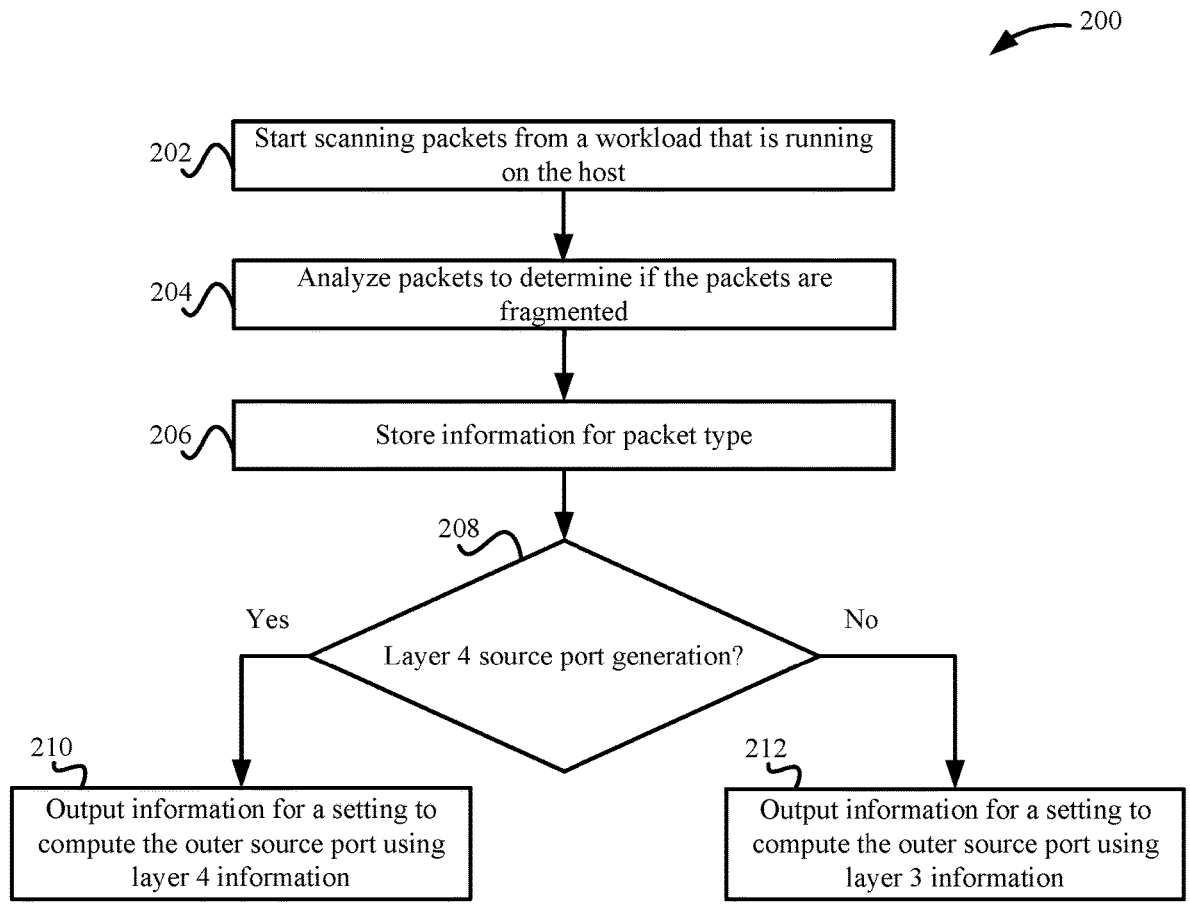
FIG. 2 depicts a simplified flowchart of a method for scanning packets according to some embodiments.

FIG. 2 depicts a simplified flowchart 200 of a method for scanning packets according to some embodiments. Packet type scanner 122 may scan for packet types using different methods. The following will describe performing the scanning when a workload 106 is instantiated on host 102. However, the scan may be run at different times, such as continuously, at intervals, upon receiving a manual request, etc. At 202, packet type scanner 122 starts scanning packets from a workload 106 that is running on host 102. In some embodiments, the scan may start when a workload 106 is instantiated on host 102 and last a period of time to capture a profile of the types of packets that most likely are sent by workload 106. For example, an application 108 running on workload 106 may typically operate similarly over time and send the same types of packets.

At 204, packet type scanner 122 analyzes packets to determine if the packets are fragmented. Packet type scanner 122 may determine that a packet is fragmented using different methods. For example, a flag in inner IPv4 header 404 may be set in a flags field, such as a "more fragment" flag is set to indicate the packet is fragmented from a larger packet. The more fragment flag may indicate that more fragments may be sent and is set in fragmented packets except the last fragmented packet. Also, packet type scanner 122 may review the fragment offset value in inner IPv4 header 404, which indicates the offset of this fragment relative to the beginning of the original unfragmented packet. The last packet may have a fragment offset and the last packet can be identified as a fragment using the offset. Packet type scanner 122 may also use other methods to determine if packets are fragmented.

At 206, packet type scanner 122 stores information for the packet type. For example, packet type scanner 122 may maintain a count of fragmented packets that are sent by an application 108 running on a workload 106. The above process may be performed for a period of time before proceeding to 208.

At 208, packet type scanner 122 determines if layer 4 source port generation should be used for application 108. After a time period, packet type scanner 122 may determine whether fragmented packets are being sent by an application 108. In some examples, packet type scanner 122 may compare a number of fragmented packets that were sent by application 108 to a threshold. If the number of packets meets a threshold (e.g., above a threshold), then packet type scanner 122 may determine that layer 4 source port generation should not be used because application 108 may send a fragmented packet. If the number of packets does not meet a threshold (e.g., lower than a threshold), then packet type scanner 122 may determine that layer 4 source port generation may be used because application 108 may not send a fragmented packet. In some embodiments, packet type scanner 122 may determine a probability that workload 106 may send a fragmented packet. The probability may be determined using different methods, such as by using prediction networks, rules, etc. For example, a prediction network may analyze the types of packets and predict whether workload 106 may send a fragmented packet. Packet type scanner 122 may compare the probability to a threshold to determine if the probability of sending a fragmented packet is above or below a threshold. Packet type scanner 122 may enable layer 4 source port generation when the probability of sending a fragmented packet is low (e.g., below a threshold).

At 210, if layer 4 source port generation is enabled, packet type scanner 122 outputs information for a setting, such as a property that indicates overlay module 126 should compute the outer source port using layer 4 information. Packet type scanner 112 may send information for the setting to controller 124, which may automatically set which source port generation to use at overlay module 126. Also, in some embodiments, packet type scanner 122 may output the analysis of packet types to a user, which may choose to set the property or not in controller 124.

Controller 124 may communicate information for the setting of the property to overlay module 126. As discussed above, the setting may be at the application port level, the virtual switch port level, and/or the virtual switch level. If the setting is at the application port level, controller 124 may set the property for a specific port of an application 108 on a workload 106. Other ports for applications 108 running on that workload that do not have the property set may have the outer source port generated using layer 3 source port generation. If the setting is at the virtual switch port level, controller 124 may set a property to allow certain virtual switch ports to use layer 4 source port generation. This setting may be used when applications 108 running on a workload 106 that is coupled to the virtual switch port are determined not to send fragmented packets. However, controller 124 may restrict all packets received at the virtual switch port to layer 3 source port generation when one application 108 on that workload 106 should use layer 3 source port generation. For example, when controller 124 determines that one application running on a workload 106 may send fragmented packets, then controller 124 restricts all applications 108 running on that workload to layer 3 source port generation. If the setting is at the virtual switch level, controller 124 may set a property to allow all packets sent by virtual switch 104 to use layer 4 source port generation or restrict all workloads 106 to layer 3 source port generation when one application 108 on a workload 106 should use layer 3 source port generation. The use of different levels may be configurable. Although the above discussed setting a property to allow for layer 4 source port generation, the property may be set to indicate layer 3 source port generation should be used. That is, applications 108 or workloads 106 that do not have the property set may use layer 4 source port generation.

At 212, if layer 4 source port generation is not enabled, packet type scanner 122 outputs a setting that indicates overlay module 126 should compute the outer source port using layer 3 information. As discussed above, packet type scanner 122 may set a property to indicate layer 3 source port generation should be used or a default process may be to use layer 3 source port generation if the property for using layer 4 source port generation is not set. Different implementations may be used to send information to overlay module 126 to indicate which source port generation to use.

The scanning and setting may be applied throughout the active period of the flow. For example, packet type scanner 122 may scan packet types and apply the setting to use layer 4 source port generation. After scanning additional packet types, packet type scanner 122 may change the setting to use layer 3 source port generation, such as if fragmented packets are detected.

Packet Processing

Figure 3:
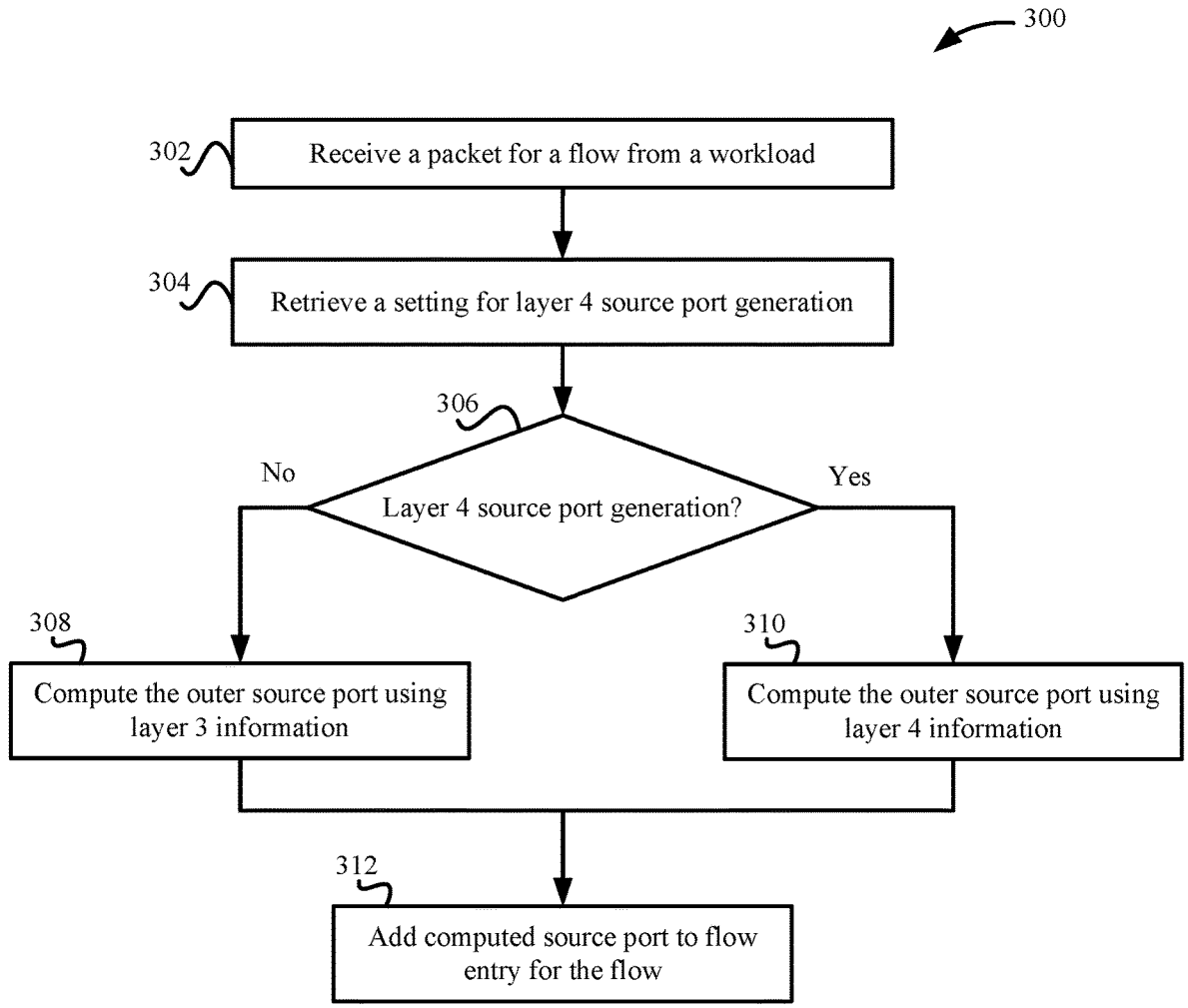
FIG. 3 depicts a simplified flowchart of a method for determining which source port generation process to use according to some embodiments.

After receiving information for a setting for source port generation, overlay module 126 may process packets for a flow. FIG. 3 depicts a simplified flowchart 300 of a method for determining which source port generation process to use according to some embodiments. At 302, virtual switch 104-1 receives a packet for a flow, such as a flow from workload #1 106-1 to workload #2 106-2. For example, a first packet is sent from application #1 108-1 to application #3 108-3. This first packet may be sent after the packet scanning period ends.

At 304, overlay module 126-1 retrieves a setting for layer 4 source port generation. The setting may be applied using different methods. For example, overlay module 126-1 may receive information from controller 124 to allow it to determine whether to perform layer 4 source port generation at the different levels. For example, overlay module 126-1 may receive flows from controller 124 with a setting describing which source port generation to perform for the flows The flows may define the inner source IP address, the inner source port, the inner destination IP address, and the destination port of the packet. Also, overlay module 126-1 may dynamically create flows based on the information for the settings. Depending on the level a setting is set, overlay module 126-1 may determine the setting for the flow differently. For example, at the virtual switch level, overlay module 126-1 may perform layer 4 source port generation for every packet received at virtual switch 104-1 or layer 3 source port generation for every packet received at virtual switch 104-1. At the virtual switch port level, overlay module 126-1 may determine the virtual switch port of a packet, such as by inspecting metadata of the packet to determine the virtual switch port. Then, overlay module 126-1 checks whether a property for layer 4 source port generation is set for the virtual switch port. At the application level, overlay module 126-1 may look up the inner source IP address, the inner source port, the destination IP address, and the inner destination port of the packet. Then, overlay module 126-2 looks up a property for the flow to determine whether to use layer 4 source port generation. For example, a property may be set for the flow indicating layer 4 source port generation is to be performed.

At 306, overlay module 126-1 determines if layer 4 source port generation should be performed. If layer 4 source port generation should not be performed, at 308, overlay module 126-1 computes the outer source port using layer 3 information. If layer 4 source port generation should be performed, at 310, overlay module 126-1 computes the outer source port using layer 4 information.

Figure 4:
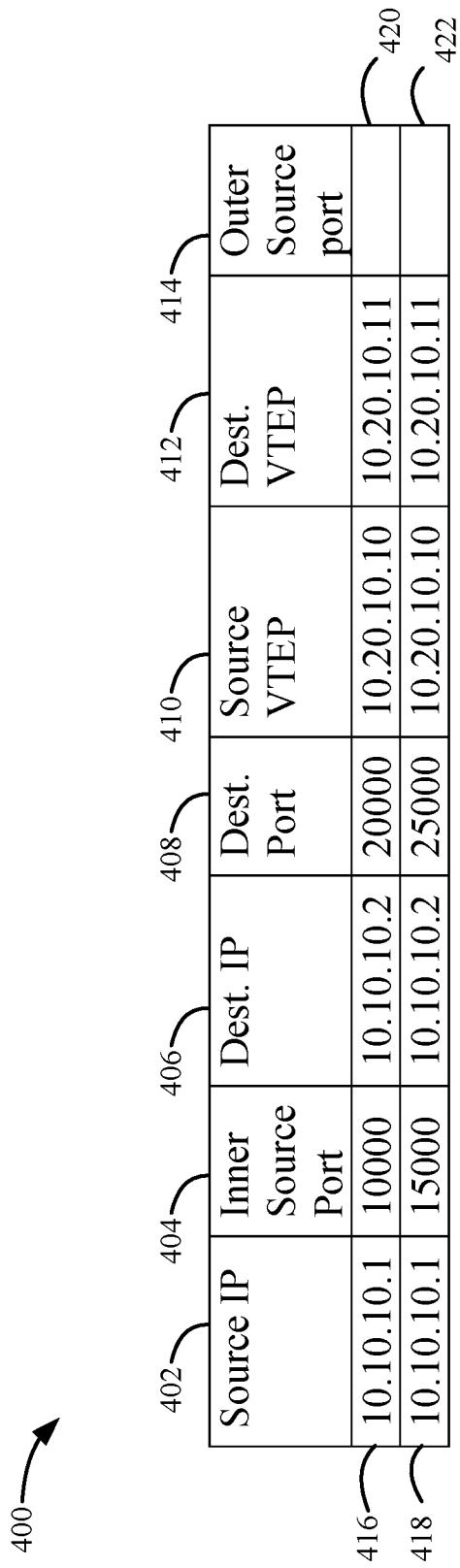
FIG. 4 depicts an example of flow entries in a flow table according to some embodiments.

At 312, overlay module 126-1 adds the outer source port to a flow entry for the flow. For example, overlay module 126-1 may add a source port that is computed via layer 4 source port generation or layer 3 source port generation. FIG. 4 depicts an example of flow entries in a flow table 400 according to some embodiments. Flow table 400 includes columns 402 to 414 for the inner source IP address, the inner source port, the inner destination IP address, the inner destination port, the source VTEP IP address, the destination VTEP IP address, and the outer source port, respectively. Each entry of flow table 400 may be associated with a different flow, such as a flow 416 is associated with application #1 108-1 and application #3 108-3 and a flow 418 is associated with application #2 108-2 and application #4 108-4. The flow entries include inner layer 3 information of the IP addresses for workloads 106-1 and 106-2 and respective layer 4 information for the source ports of respective applications 108-1 to 108-4. Also, the flow entries include outer IP addresses for VTEPs 110.

Source port generator 114-1 uses information in the flow entries are used to generate outer source ports at 420 and 422 for the outer header. For example, source port generator 114-1 uses layer 3 and layer 4 information or layer 3 information without layer 4 information to generate the outer source port. In some examples, when using both layer 3 and layer 4 information, source port generator 114-1 may use a 5-tuple of <inner source IP address, inner destination IP address, IP next protocol, inner source port, destination source port>. The inner source IP address and inner source port are associated with the sender; the inner destination IP address and inner destination port are associated with the destination; and IP next protocol may be the protocol used for the encapsulation header. In this 5-tuple, source port generator 114-1 may use the layer 4 inner source port value and the layer 4 inner destination port value as part of the source port generation process, such as by using a hash of the 5-tuple values. When using different layer 4 inner source port and the layer 4 inner destination port values, source port generator 114-1 generates different values for the outer source port values. For example, for a flow #1 between application #1 108-1 and application #3 108-3, the inner source port is 10000 and the inner destination port is 20000. For application #2 108-2, the inner source port is 15000 and the inner destination source port is 25000. Source port generator 114-1 thus generates different outer source port values when using the layer 4 information of the source and destination ports for the different flows. When using layer 3 and not layer 4 information, source port generator 114-1 may use a 3-tuple of <inner source IP address, inner destination IP address, IP next protocol>. The flows between the same workloads 106 may have the same outer source ports in this case.

Figure 5:
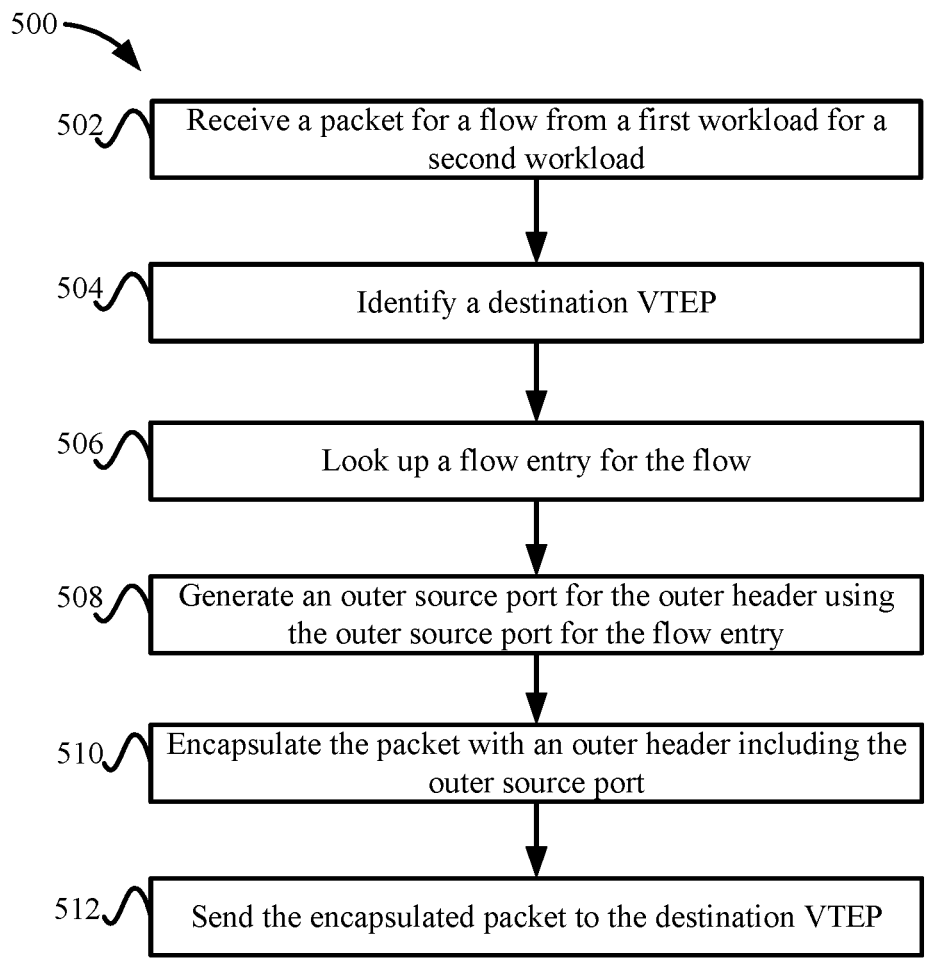
FIG. 5 depicts a simplified flowchart of a method for sending encapsulated packets using source port generation according to some embodiments.

Once generating the flow entry, virtual switch 104-1 uses the entry to send encapsulated packets in the flow. FIG. 5 depicts a simplified flowchart 500 of a method for sending encapsulated packets using source port generation according to some embodiments. The flow is from host 102-1 to host 102-2, but similar processes from host 102-2 to host 102-1 also apply. At 502, virtual switch 104-1 receives a packet for a flow, such as a flow from workload #1 106-1 to workload #2 106-2. When a packet is sent between application #1 108-1 and application #3 108-3, the inner header includes an inner source IP address of workload #1 106-1 (10.10.10.1), an inner destination IP address of workload #2 106-2 (10.10.10.2), an inner source port of 10000 for application #1 108-1, and an inner destination port of 20000 for application #3 108-3. The inner source IP address and the inner destination IP address are layer 3 information and the inner source port and inner destination port are layer 4 information. When a communication occurs between application #2 108-2 and application #4 108-4, the inner source IP address and the inner destination IP address are the same because the same workloads are sending and receiving the packets, but the inner source port is 15000 for application #2 108-2 and the inner destination port is 25000 for application #4 108-4.

At 504, virtual switch 104-1 may identify the destination VTEP for workload #2 106-2. In some embodiments, virtual switch 104-1 uses a table to identify the VTEP. For example, the table lists media access control (MAC) address for workloads 106 and associated VTEP IP addresses for the associated workloads 106. Virtual switch 104-1 may look up the MAC address for a destination workload to determine the associated VTEP. When workload #2 is the destination, virtual switch 104-1 determines that the VTEP IP address is 10.20.10.11 (e.g., VTEP 110-2).

At 506, source port generator 114-1 looks up a flow entry for the flow that can be used to compose an encapsulation header. The flow entry may include different information for the flow.

At 508, source port generator 114-1 generates an outer source port for the outer header using the information for the outer source port in the associated flow entry. The outer source port may be generated using layer 4 source port generation or layer 3 source port generation.

At 510, VTEP 110-1 encapsulates the packet with an outer header that includes the generated outer source port. Then, at 512, host #1 102-1 sends the encapsulated packet to destination VTEP 110-2 via physical network 116. Physical network 116 routes the encapsulated packet using information in the outer header. Once receiving the encapsulated packet, PNIC 112-2 processes the packet, and then VTEP 110-2 decapsulates the packet. Virtual switch 104-2 can deliver the unencapsulated packet to workload 106-2 via the specified destination port to the destination application 108.

Header Examples

Figure 7:
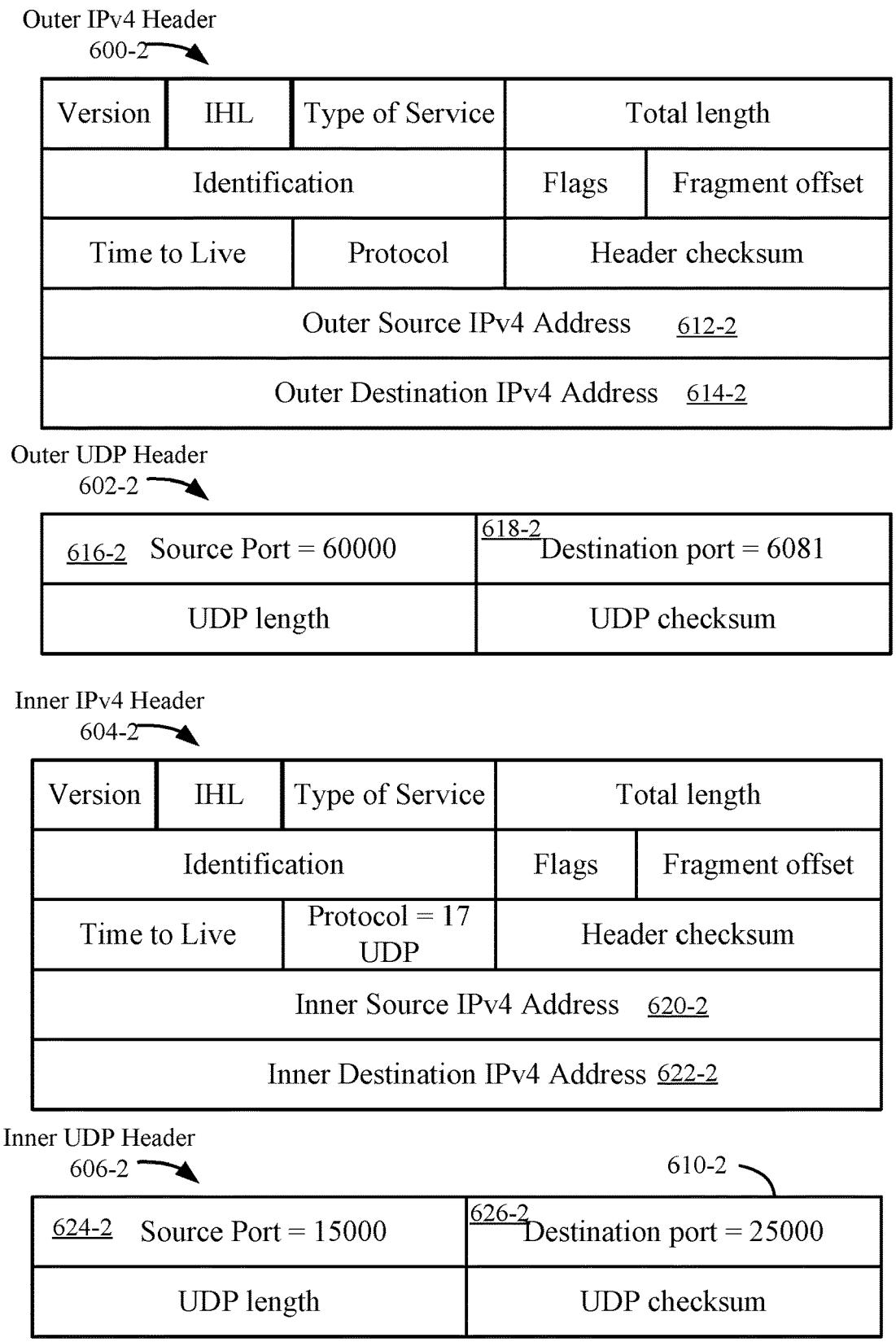
FIG. 7 depicts an example of outer headers and inner headers for a flow #2 between application #2 and application #4 according to some embodiments.

FIGS. 6 and 7 depict examples of outer headers and inner headers according to some embodiments. FIG. 6 depicts an example of outer headers and inner headers for a flow #1 between application #1 108-1 and application #3 108-3 according to some embodiments. Outer IPv4 header 600-1 and outer UDP header 602-1 encapsulate the inner packet which includes inner IPv4 header 604-1 and inner UDP header 606-1. These headers include various fields that are well-known in the art and need not be described.

Outer IPv4 header 600-1 includes an outer source IPv4 address at 612-1 and an outer destination IPv4 address at 614-1. The outer source IPv4 address at 612-1 is associated with workload #1 106-1 and the outer destination IPv4 address is associated with workload #2 106-2. Although the protocol IPv4 is described, other IP protocols may be used, such as the protocol IPv6. Outer IPv4 header 600-1 also includes other fields, such as a protocol version which signifies the current IP protocol version used, the header length (IHL), type of service, total length, identification, flags, fragment offset, time to live, protocol, and header checksum.

Outer UDP header 602-1 may use the UDP protocol. UDP header 602-1 includes an outer source port at 616-1, an outer destination port at 618-1, a UDP length, and a UDP checksum. The outer destination port may be a well-known port used by the tunneling protocol, which is listed as "6081" because the tunneling technology of Geneve is being used in this case, but the outer destination port may be other values. The destination port may be the same for all packets sent using the same tunneling technology.

Inner IPv4 header 604-1 includes an inner source IPv4 address at 620-1 for workload 106-1 and an inner destination IPv4 address at 622-1 for workload 106-2. Inner UDP header 606-1 includes an inner source port of "10000" at 624-1 and an inner destination port of "20000" at 626-1. Inner source port is the port associated with application #1 108-1 and the inner destination port is the port associated with application #3 108-3. At 616-1, the source port value of "50000" is generated by using the inner source IPv4 address of inner IPv4 header 604-1, the inner destination IPv4 address of inner IPv4 header 604-1, the source port of inner UDP header 606-1, and the destination port of inner UDP header 606-1 (and the next level protocol). The following will show the differences in source port generation for a different flow.

FIG. 7 depicts an example of outer headers and inner headers for a flow #2 between application #2 108-2 and application #4 108-4 according to some embodiments. Flow #2 is between the same workloads #1 and #2, but the communication is between different applications 108 (e.g., one or two different applications) from flow #1. In outer IPv4 header 600-2, the inner source IPv4 address at 612-2 and the inner destination IPv4 address at 614-2 are the same as found in outer IPv4 header 600-1 for flow #1 because VTEPs 110 are the same for the flows. Further, in inner IPv4 header 604-2, the inner source IPv4 address at 620-2 and the inner destination IPv4 address at 622-2 are the same as found in inner IPv4 header 604-1 for flow #1 because workloads 106 are the same for the flows. However, at 624-2 and 626-2, the inner source port and the inner destination port are different in inner header 606-2 compared to inner header 606-1 in FIG. 6 because different applications 108 that are associated with different ports are used. When source port generator 114 uses different values for the inner source port and the inner destination port to generate the source port for outer UDP header, the source port value of 60000 at 616-2 is different from the source port value of "50000" at 616-1 in outer UDP header 602-1 in FIG. 6.

Figure 8:
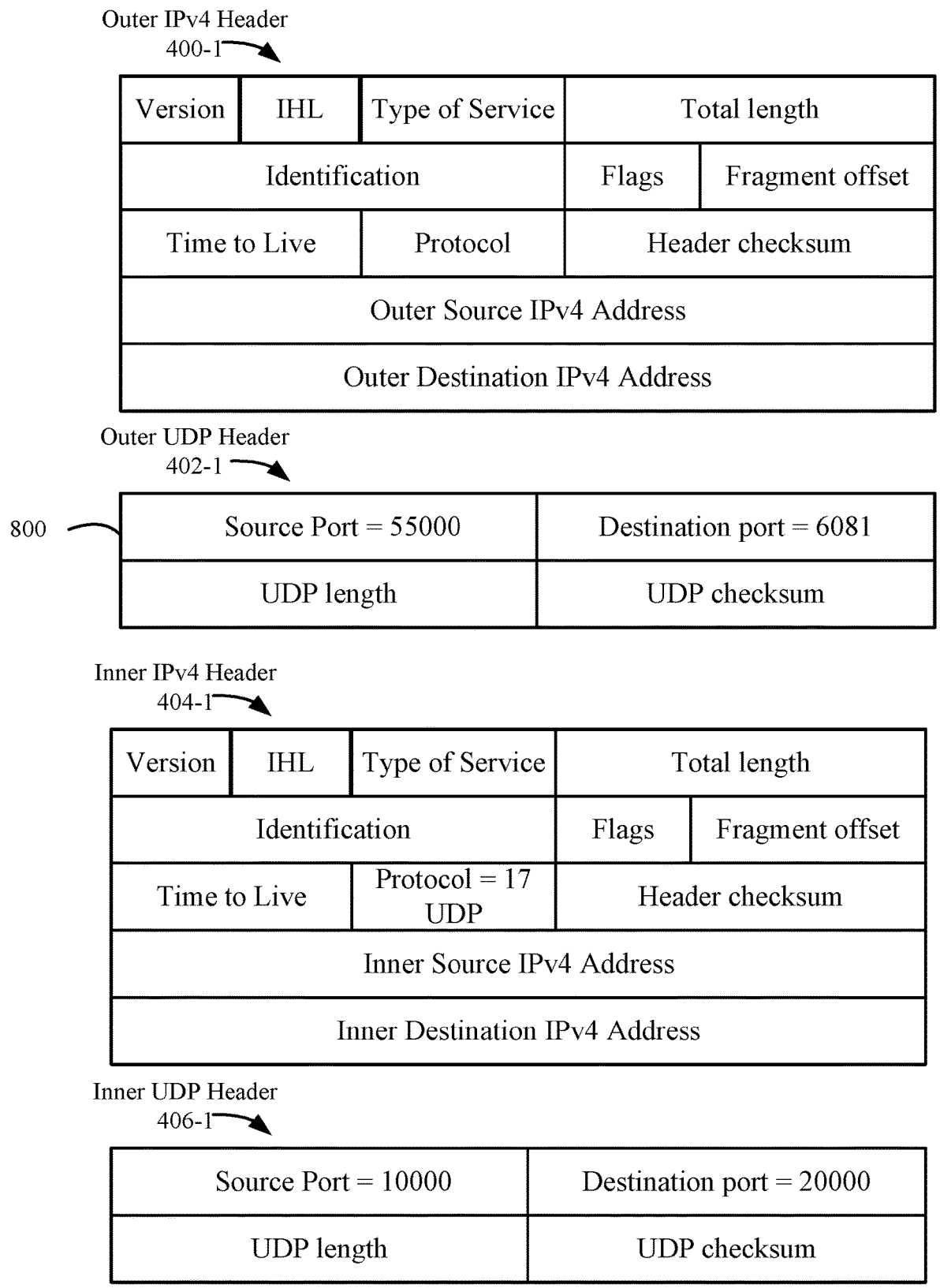
FIG. 8 depicts an example of the outer header and inner header using layer 3 source port generation for both flows according to some embodiments.

When using layer 3 source port generation, the outer source port is the same flows using layer 3 source port generation between the same two workloads 106 as discussed above. FIG. 8 depicts an example of the outer header and inner header using layer 3 source port generation for both flows according to some embodiments. At 800, the outer source port is equal to 55000. Because the inner source IPv4 address and the inner destination IPv4 address is used to generate the outer source port and not the inner source port and the inner destination port, the outer source port for outer UDP header 602-1 will be the same for both flows.

Also, the source port value of 55000 is different from the source port value of 50000 for flow #1 and 60000 for flow #2 when using layer 4 source port generation. However, if multiple flows switch to using layer 3 source port generation because it is determined the flows send fragmented packet, then processes may not be able to differentiate between the flows because the outer source port is the same along with the other information in a tuple that is used to perform load balancing.

Flow Processing

As discussed above, when generating different source ports for the two different flows, processing of the flows may be differentiated, such as services including load balancing may be injected in the processing path of the flows. The following describes some services and the differences between layer 4 source port generation and layer 3 source port generation, but other services may be used.

Figure 9A:
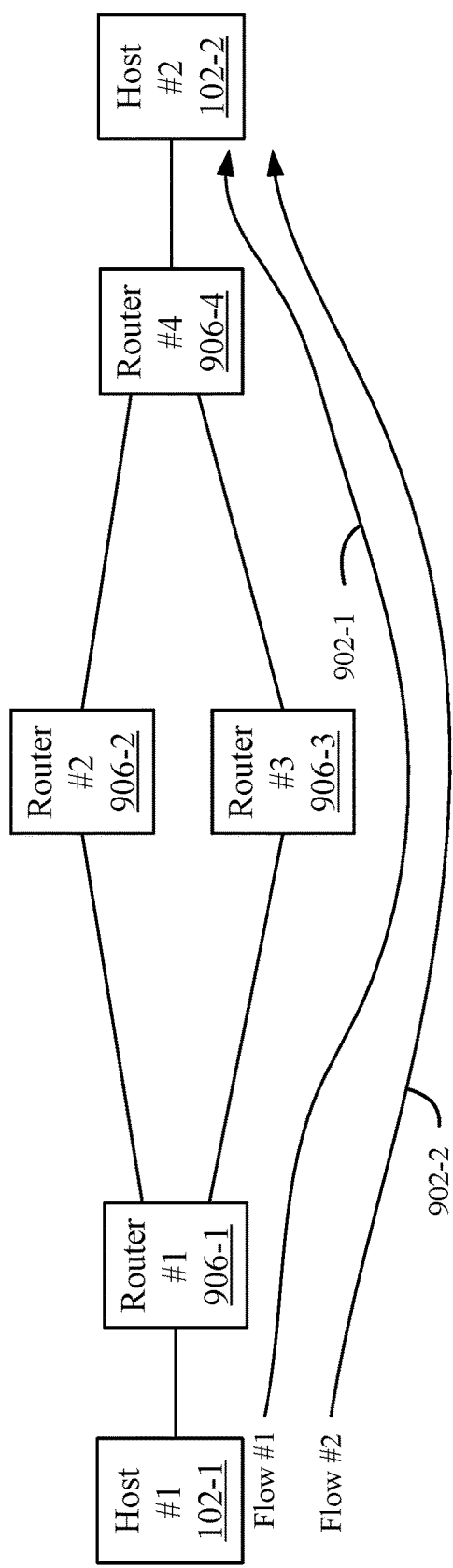
FIG. 9A depicts an example of load balancing over a physical network that may occur when using layer 3 source port generation according to some embodiments.

FIG. 9A depicts an example of load balancing over physical network 116 that may occur when using layer 3 source port generation according to some embodiments. Physical network 116 may include multiple paths that may be used to send packets to the same destination. For example, physical network 116 may include a router #1 906-1 that can use two different paths to reach router #4 906-4, which can then send a packet to host #2 102-2. For example, a first path is through router #2 906-2 and a second path is through router #3 906-3. Different load balancing processes may be used, such as using equal cost multi-path (ECMP) load balancing. The load balancing process may use information in the outer header to determine which path to take. Flow #1 may be associated with application #1 108-1 and application #3 108-3 and flow #2 may be associated with application #2 108-2 and application #4 108-4. In FIG. 9A, source port generator 114 uses layer 3 information from the inner UDP header to generate the outer source port because packet type scanner 122 determined that applications 108 for the flows may send fragmented packets. As discussed above, this means that the outer source port is the same for both flows. Accordingly, if the outer source IP address, the outer destination IP address, the outer source port, and the outer destination port (and the next level protocol) are the same, then router #1 906-1 may send flow #1 at 902-1 and flow #2 at 902-2 through the same path of router #3 906-3. This does not provide parallelization of processing for the two different flows through different paths.

Figure 9B:
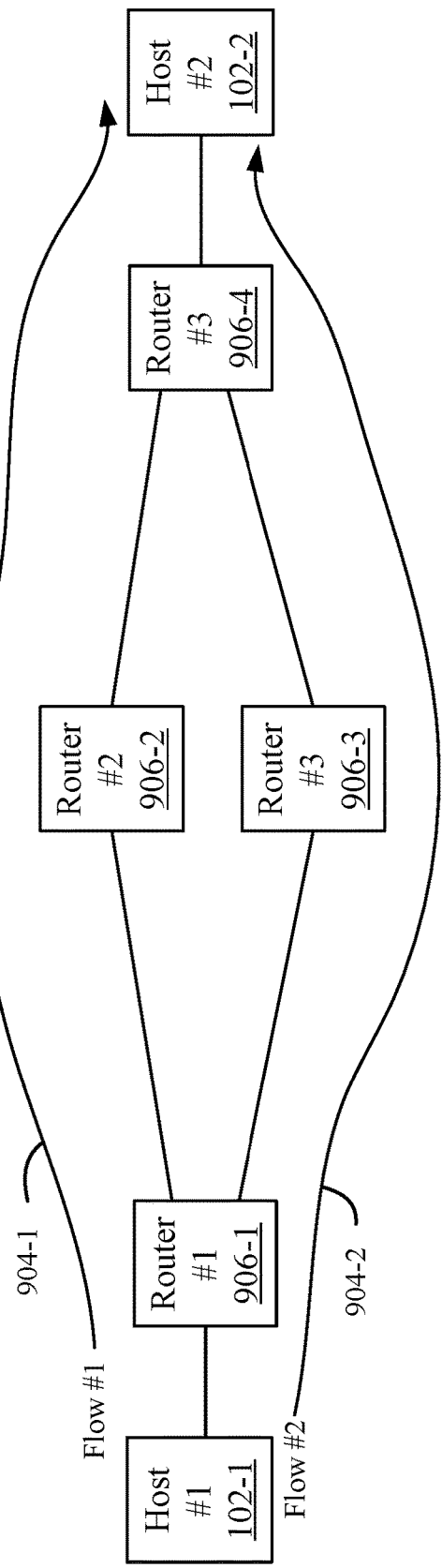
FIG. 9B depicts an example of paths taken using layer 4 source port generation according to some embodiments.

FIG. 9B depicts an example of paths taken using layer 4 source port generation according to some embodiments. In this case, packet type scanner 122 determined that applications 108 associated with the flows may not send fragmented packets. As shown, flow #1 may be sent through a path at 904-1 through router #2 906-2 and flow #2 at 904-2 may be sent through a path through router #3 906-3. The load balancing process may generate different values for packets of the different flows because the outer source ports are different in the outer headers of packets for the different flows. Accordingly, a load balancer can differentiate packets for the two flows and may send packets for the flows through the two different paths.

Figure 10A:
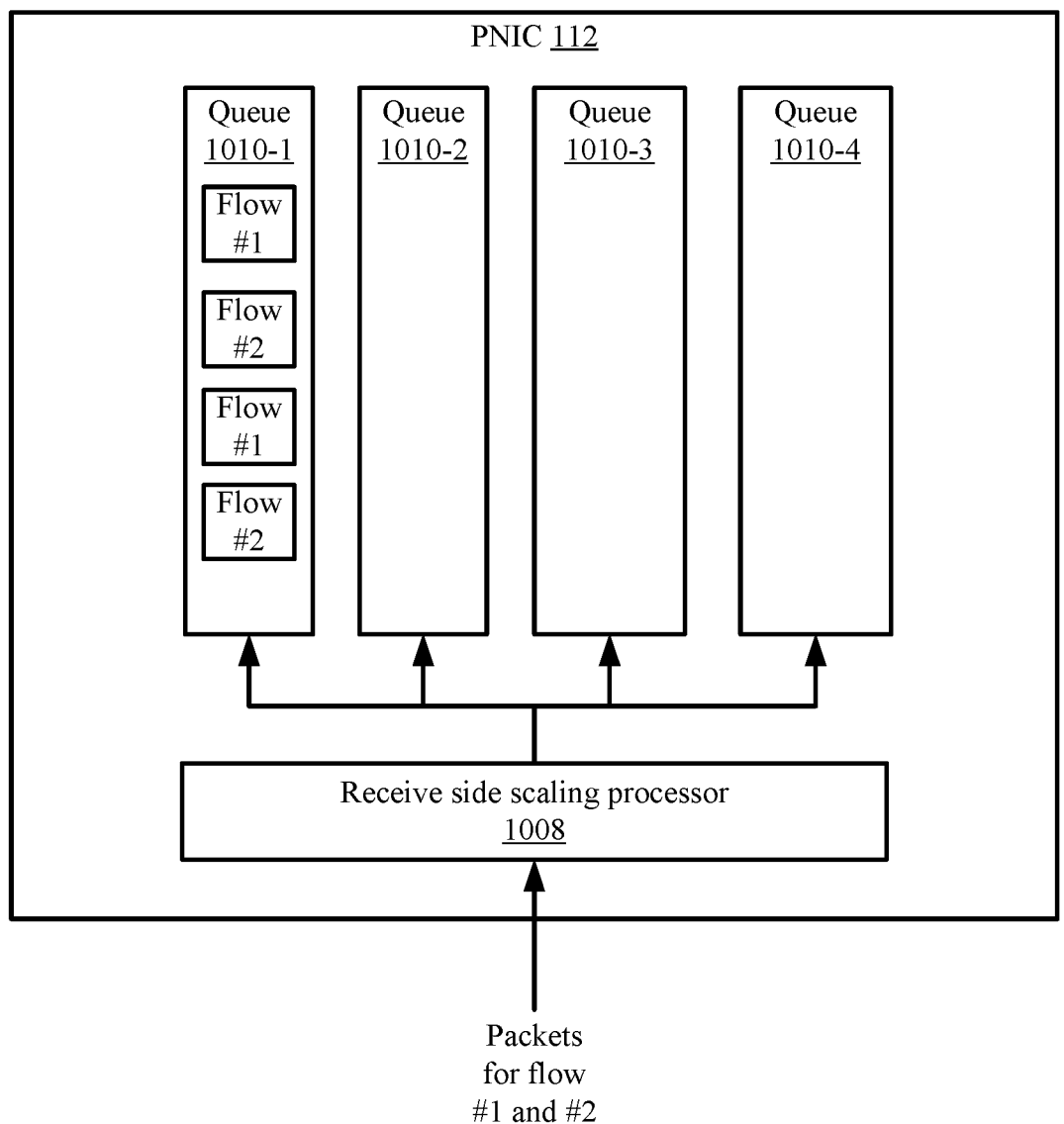
FIG. 10A depicts an example of receive side scaling using layer 3 source port generation according to some embodiments.

Load balancing may also be performed in PNICs 112 using receive side scaling. Receive side scaling may place flows on different queues that process packets in PNIC 112. FIG. 10A depicts an example of receive side scaling using layer 3 source port generation according to some embodiments. PNIC 112 may include queues 1010-1 to 1010-4 that may process packets. In some embodiments, each queue 1010 may be associated with a different computer processor that performs operations associated with a respective queue 1010. Accordingly, packets in each queue 1010 may be processed in parallel by respective computer processors.

A receive side scaling processor 1008 receives packets for flow #1 and flow #2. Receive side scaling processor 1008 may calculate a queue 1010 to assign to the flow based on information in the outer header of the packets. When the outer source port is the same for flow #1 and flow #2, receive side scaling processor 1008 may associate the same queue 114 for each flow. As shown, receive side scaling processor 1008 has assigned packets from flow #1 to queue 114-1 and packets from flow #2 to queue 114-1. It will be understood that packets in queues 114 may be references to packets that are stored in memory. Accordingly, flow #1 and flow #2 may be processed in serial in the same queue. Receive side scaling processor 1008 assigns packets for flow #1 and flow #2 to the same queue when using a hash of the outer source IP address, the outer destination IP address, the outer source port, the outer destination port, and the next level protocol to determine the queue.

Figure 10B:
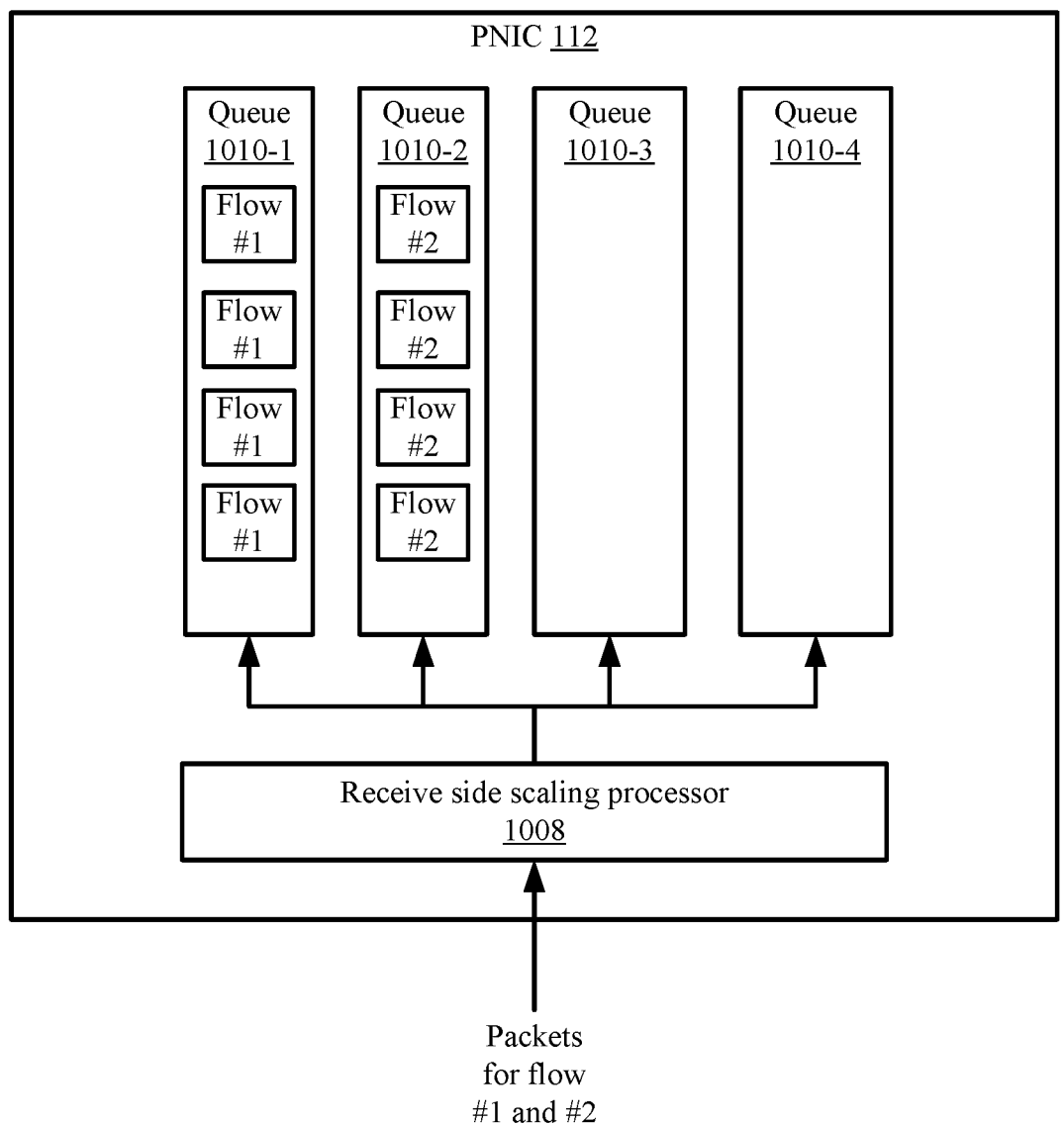
FIG. 10B depicts an example of receive side scaling using layer 4 source port generation according to some embodiments.

FIG. 10B depicts an example of receive side scaling using layer 4 source port generation according to some embodiments. When the outer source port is different for flow #1 and flow #2, receive side scaling processor 1008 may associate a different queue 114 for each flow. As shown, receive side scaling processor 1008 has assigned packets from flow #1 to queue 114-1 and packets from flow #2 to queue 114-2. Accordingly, flow #1 and flow #2 may be processed in parallel in different queues achieving parallelization. Since the source port is different, receive side scaling processor 1208 may assign packets for flow #1 and flow #2 to different queues when using a hash of the outer source IP address, the outer destination IP address, the outer source port, the outer destination port, and the next level protocol to determine the queue because the outer source ports are different for the two flows.

In addition to receive side scaling, load balancing may be performed in other areas. For example, workloads 106 may also include receive queues that may be associated with different computer processors. The same load balancing as described with respect to receive side scaling may also be applied to the receive queues of workloads 106.

CONCLUSION

Accordingly, virtual switch 104 can perform layer 4 source port generation, which allows the system to apply load balancing to different flows between the same workloads. Scanning for packet types allows the system to avoid problems associated with sending fragmented packets that use layer 4 source port generation. Setting of the property for applications 108 after scanning allows the flows to utilize load balancing when non-fragmented packets are being sent while protecting against introducing re-ordering of packets when an application is sending fragmented packets.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations, and equivalents may be employed without departing from the scope of the disclosure as defined by the claims.

What is claimed is:

1. A method comprising:
receiving a packet for a flow from a first application in a first workload to a second application in a second workload, wherein the packet includes an inner header that includes layer 4 information for the first application;
determining if information for a setting indicates an outer source port in an outer header should be generated using the layer 4 information from the inner header, wherein the information for the setting is based on an analysis of packet types in the flow to determine if fragmented packets are sent in the flow;
when the information for the setting indicates the outer source port in the outer header should be generated using the layer 4 information from the inner header, generating the outer source port using the layer 4 information for the first application from the inner header; and
encapsulating the packet using the outer header, wherein the outer header includes the outer source port.

2. The method of claim 1, wherein the analysis of packet types comprises: determining if fragmented packets are sent in the flow during a time period; and using a count of the fragmented packets to determine whether to set the setting to indicate the outer source port in the outer header should be generated using the layer 4 information from the inner header.

3. The method of claim 1, wherein the information for the setting is associated with a port of the first application, and wherein packets associated with the port of the first application have the outer source port generated using the layer 4 information for the first application from the inner header.

4. The method of claim 1, further comprising: when the information for the setting indicates the outer source port in the outer header should be generated using layer 3 information from the inner header, generating the outer source port using the layer 3 information for the first workload from the inner header.

5. The method of claim 1, wherein the information for the setting is associated with a virtual switch, and wherein packets sent by the virtual switch have the outer source port generated using the layer 4 information for the first application from the inner header.

6. The method of claim 1, wherein the information for the setting is associated with a port of a virtual switch, and wherein packets associated with the port of the virtual switch have the outer source port generated using the layer 4 information for the first application from the inner header.

7. The method of claim 6, wherein the port comprises a first port of the virtual switch, and wherein packets associated with a second port of the virtual switch have the outer source port generated using the layer 3 information for a second workload from an inner header of the packets.

8. A non-transitory computer-readable storage medium containing instructions, that when executed by a processor, cause the processor to perform the following operations:
receiving a packet for a flow from a first application in a first workload to a second application in a second workload, wherein the packet includes an inner header that includes layer 4 information for the first application;
determining if information for a setting indicates an outer source port in an outer header should be generated using the layer 4 information from the inner header, wherein the information for the setting is based on an analysis of packet types in the flow to determine if fragmented packets are sent in the flow;
when the information for the setting indicates the outer source port in the outer header should be generated using the layer 4 information from the inner header, generating the outer source port using the layer 4 information for the first application from the inner header; and
encapsulating the packet using the outer header, wherein the outer header includes the outer source port.

9. The non-transitory computer-readable storage medium of claim 8, wherein the analysis of packet types comprises: determining if fragmented packets are sent in the flow during a time period; and using a count of the fragmented packets to determine whether to set the setting to indicate the outer source port in the outer header should be generated using the layer 4 information from the inner header.

10. The non-transitory computer-readable storage medium of claim 8, wherein the setting is associated with a port of the first application, and wherein packets associated with the port of the first application have the outer source port generated using the layer 4 information for the first application from the inner header.

11. The non-transitory computer-readable storage medium of claim 8, further operable for: when the setting indicates the outer source port in the outer header should be generated using layer 3 information from the inner header, generating the outer source port using the layer 3 information for the first workload from the inner header.

12. The non-transitory computer-readable storage medium of claim 8, wherein the setting is associated with a virtual switch, and wherein packets sent by the virtual switch have the outer source port generated using the layer 4 information for the first application from the inner header.

13. The non-transitory computer-readable storage medium of claim 8, wherein the setting is associated with a port of a virtual switch, and wherein packets associated with the port of the virtual switch have the outer source port generated using the layer 4 information for the first application from the inner header.

14. The non-transitory computer-readable storage medium of claim 13, wherein the port comprises a first port of the virtual switch, and wherein packets associated with a second port of the virtual switch have the outer source port generated using the layer 3 information for a second workload from an inner header of the packets.

15. An apparatus comprising:
one or more computer processors; and
a non-transitory computer-readable storage medium comprising instructions, that when executed, control the one or more computer processors to be operable for:
receiving a packet for a flow from a first application in a first workload to a second application in a second workload, wherein the packet includes an inner header that includes layer 4 information for the first application;
determining if information for a setting indicates an outer source port in an outer header should be generated using the layer 4 information from the inner header, wherein the setting is based on an analysis of packet types in the flow to determine if fragmented packets are sent in the flow;
when the setting indicates the outer source port in the outer header should be generated using the layer 4 information from the inner header, generating the outer source port using the layer 4 information for the first application from the inner header; and
encapsulating the packet using the outer header, wherein the outer header includes the outer source port.

16. The apparatus of claim 15, wherein the analysis of packet types comprises: determining if fragmented packets are sent in the flow during a time period; and using a count of the fragmented packets to determine whether to set the setting to indicate the outer source port in the outer header should be generated using the layer 4 information from the inner header.

17. The apparatus of claim 15, wherein the setting is associated with a port of the first application, and wherein packets with the port of the first application have the outer source port generated using the layer 4 information for the first application from the inner header.

18. The apparatus of claim 15, further operable for: when the setting indicates the outer source port in the outer header should be generated using layer 3 information from the inner header, generating the outer source port using the layer 3 information for the first workload from the inner header.

19. The apparatus of claim 15, wherein the setting is associated with a virtual switch, and wherein packets associated sent by the virtual switch have the outer source port generated using the layer 4 information for the first application from the inner header.

20. The apparatus of claim 15, wherein the setting is associated with a port of a virtual switch, and wherein packets associated with the port of the virtual switch have the outer source port generated using the layer 4 information for the first application from the inner header.

21. The apparatus of claim 20, wherein the port comprises a first port of the virtual switch, and wherein packets associated with a second port of the virtual switch have the outer source port generated using the layer 3 information for a second workload from an inner header of the packets.

* * * * *